United States Patent Office 2,884,397
Patented Apr. 28, 1959

2,884,397

FREEZE STABILIZED POLYMERIC LATEX COATINGS CONTAINING N-ALIPHATIC-BETA AMINO BUTYRATES AND PROCESS FOR PREPARING SAME

Donald J. Berenschot and Sidney N. Pinhasik, Chicago, and Karl M. Bierman, Park Forest, Ill., assignors to Armour and Company, Chicago, Ill., a corporation of Illinois No Drawing. Application April 5, 1957
Serial No. 650,813

20 Claims. (Cl. 260—29.7)

This invention relates to water base coating compositions containing polymeric organic material dispersed therein in finely divided form. In one of its aspects, this invention relates to a method of stabilizing emulsion polymers used in water base coating compositions from breakdown due to alternate freezing and thawing of the aqueous or continuous phase. In a preferred aspect, this invention relates to the use of N-aliphatic-beta-amino butyrates for the stabilization of emulsion polymers used in water base coating compositions from breakdown due to alternate freezing and thawing of the aqueous phase.

Recently the commercial importance of emulsion-type water base compositions for coating purposes has developed to the extent of being a major replacement for the convention solvent-type coatings useful for finishing and redecorating interior wall areas. Freedom from solvent odor, ease of application, freedom from fire hazard and economy in use have contributed materially to consumer acceptance of water base protective and decorative coatings.

The large consumer demand has meant increased inventories of finished latex emulsion paints and has brought into focus the problem of storage and handling of water-containing materials under a variety of weather conditions. The greatest hazard in handling and storage of emulsion paints containing water in the continuous phase arises from storage and handling at freezing temperatures. Often in either shipment or storage, large quantities of these materials freeze. Upon subsequent thawing, the coating composition loses fluidity and can no longer be satisfactorily applied by brushing. The lot frozen becomes a total loss. While heated warehousing and heated shipping means may offer a solution, this solution is impractical over a nation-wide distribution system common in this industry.

It is, therefore, an object of this present invention to provide a water base coating composition containing an emulsion polymer which is stable against breakdown due to alternate freezing and thawing of the aqueous phase.

Further and additional objects of the present invention will become apparent as the specification proceeds.

Stabilizers useful in accordance with the present invention can be classified as N-aliphatic-beta-amino butyrates and can be illustrated structurally by the formula RNHCH($CH_3$)$CH_2$COOM wherein R is an aliphatic hydrocarbon radical having from 8 to 18 carbon atoms and M is an alkali metal such as sodium or potassium. These compounds can be made by the addition reaction of primary aliphatic amines with crotonic acid followed by neutralization with an appropriate base. Examples of amines which can be used to produce our stabilizers include octylamine, decylamine, dodecylamine, tetradecylamine, hexadecylamine, octadecylamine, octadecenylamine, octadecadienylamine, octadecatrienylamine, and mixtures of the foregoing which are obtained from the ammonolysis, dehydration and hydrogenation of the fatty acids resulting from the hydrolysis of natural occurring glyceride oils such as coconut oil, tallow, soybean oil, etc. These latter mixtures are commonly known as coco amine, tallow amine, and soya amine.

The reaction between the primary aliphatic amine as hereinbefore described and crotonic acid is a simple addition reaction and results in the corresponding N-aliphatic-beta-amino butyric acid. To produce the stabilizers useful in accordance with the present invention, the acid is neutralized with a suitable base such as sodium hydroxide or potassium hydroxide. We have also found that when certain types of amines are used as the neutralizing bases, the resulting compounds can also be used as stabilizers. These amines include N-bis(2-hydroxyethyl) soya amine, N-tallow-N,N',N'-tris(2-hydroxyethyl)trimethylene diamine and N-aliphatic trimethylene diamine.

Specific examples of stabilizers useful in accordance with the present invention include sodium N-coco-beta-amino-butyrate, potassium N-coco-beta-aminobutyrate, sodium N-dodecyl-beta-aminobutyrate, potassium N-dodecyl-beta-aminobutyrate, sodium N-soya-beta-aminobutyrate, potassium N-soya-beta-aminobutyrate, sodium N-tallow-beta-aminobutyrate, potassium N-tallow-beta-aminobutyrate, the salts of N-coco-beta-amino butyric aminobutyrate, the salts of N-coco-beta-amino butyric acid and N-bis(2-hydroxyethyl)soya amine, and the salts of N-coco-beta-amino butyric acid and N-tallow-N,N',N'-tris(2-hydroxyethyl)trimethylene diamine.

For the purpose of definition of the amount of stabilizer to enhance freeze resistance, it is preferred to base the amount upon the quantity of latex solids in the particular emulsion system. We prefer to use from about 0.10% to about 1.5% of stabilizing chemical, based upon the latex solids. Preferably, from 0.20% to 2.00% is employed. Higher amounts can be used but there is no practical necessity for using higher than the specified amounts.

The art of emulsion polymerization has reached practical utilization only recently and the published literature on the subject has been enriched greatly since the rubber shortages of World War II. While pooling of general information by those working in the field has been generally practiced, much of the specific information on actual emulsion polymerization techniques known to specific groups in the art is still not generally available. Further, the great interest and emphasis in that art has been in the production of elastomers in bulk form for use as replacements for rubber, for example, in the massive form, and not for purposes of protective and decorative coatings. Presently, therefore, definitions of all of the qualities and characteristics of emulsion polymers useful for coating purposes, cannot be set forth as the art is still fairly new. For this reason, the term "paint latex" is used to refer to emulsion polymer systems. This is for the reason that the language in this art as it relates to the subject is, like the art, fairly undeveloped. These latices are also referred to by some who are employed in the art as "reverse rubbers" for the reason that the proportions of mono-olefinic compound and diolefin are in reverse ratio to the usual copolymer rubbers used in massive form for the manufacture of tires, and the like.

The term "paint latex" as used herein refers to the concept of a dispersed phase polymer formed or polymerized in an aqueous carrier, the oil-in-water type emulsions resulting having specific physical characteristics and preferably certain chemical constituents, as will be set forth hereinafter.

More specifically, the term "paint latex" includes particularly, but is not known to be limited to, the products of emulsion polymerization. The emulsion polymers produced from two or more unsaturated polymerizable components in the presence of surface active agents of nonionic and anionic character as stabilizers and one or more percompounds, for example, peroxides, persulfates, etc., as accelerators of polymerization in such manner and proportions as to form an aqueous emulsion polymer system produce the preferred latices. Paint latices of interest in the present invention have a particle diameter of the disperse phase of about .04 to about .20 micron. The pH of the aqueous phase is from 7.5 to 11 and preferably from 8.5 to 10.5, and the water content is not more than about 65%, usually from 45 to 55%, of the total weight of the emulsion paint latex. Another essential characteristic of materials included in the term "paint latex" is that the latex or blend of two or more latices to qualify for paint and related coating usage shall be capable of agitation in a malted milk-type drink mixer at a rate of rotation of the agitator of 12,000 r.p.m. for ½ hour without showing graining, viscosity change or other characteristic evidences of emulsion breakdown. Latices not meeting the above specifications are not generally useful for coatings and are excluded from the scope of the term "paint latex" as used herein.

Presently, useful paint latices are copolymers and terpolymers comprising mono-olefinic substances such as styrene and acrylonitrile and aliphatic conjugated diolefins such as butadiene. The term "paint latex" includes the product of a single emulsion polymerization, or a blend of two or more emulsion polymerization products. However, to qualify as a paint latex, the single product or the blend of emulsion products utilized as the paint latex must be capable of depositing a continuous film from the disperse polymer containing phase.

Emulsion paints, both of the pigmented and clear class, intended for storage in shipment the year around in temperate climates are subject to freezing. Upon freezing, a great many of the paint latices of commerce break down and become valueless after several freezing and thawing cycles. It has been observed, however, that latices vary in their emulsion stability, particularly in relation to freezing, depending upon the kind and amount of ionic and nonionic emulsifier and other materials used in their manufacture in small amount, and other characteristics of the latex as are inherent in the techniques known only to the original producer. We have found, however, that the freeze and thaw cycle stability of various commercially available paint latices is enhanced by the addition of from about 0.10 to about 15% by weight based on the latex solids of a stabilizing composition as hereinbefore specifically described. Also, if a paint latex will withstand one freezing and thawing cycle, the addition of our stabilizing compound as described hereinabove permits further cycling without deterioration, impossible without the additive.

Investigation indicates that the sodium or potassium N-coco-beta-amino-butyrate or the amine salt of N-coco-beta-amino-butyric acid acts as fungicides, bactericides, and/or mold inhibitors, while active as freeze thaw stabilizers in emulsion paints of the pigmented and clear class.

The following examples will illustrate the underlying principles of our invention, but are not to be taken as unduly limiting thereof.

EXAMPLE 1

Two hundred parts of a commercially available emulsion copolymer (Dow 512-K) containing 45% solids of which 60 parts were styrene by weight and 40 parts were butadiene by weight, were frozen at −10 degrees below zero degrees F., and allowed to thaw at a temperature of 70° F. until the latex had reached the temperature of 70° F. Upon reaching the temperature of 70° F. the viscosity had increased and the latex coagulated to render it no longer useful as a film coating.

EXAMPLE 2

Two hundred parts of the above emulsion copolymer were combined with 0.45 part of sodium N-coco-beta-amino-butyrate. The sample was alternately frozen by subjecting it to a temperature of −10° F. and thawed at 70° F. five successive times. The sample showed no apparent change in viscosity or emulsion stability and could be used to deposit a clear coating of continuous nature.

EXAMPLE 3

Two hundred grams of another commercially available emulsion copolymer (Dow 762-W) containing 48% solids of which 67% by weight was styrene and 33% by weight was butadiene was subjected to the same freezing and thawing temperatures described in Example 1. After reaching the temperature of 70° F., the physical nature of the emulsion was such as to be unsuited for further emulsion paint formulations.

EXAMPLE 4

Two hundred grams of the emulsion copolymer of Example 3 was blended with 1.44 grams of the sodium N-coco-beta-amino-butyrate, and subjected to freezing and thawing as in Example 3. After 5 cycles the latex was not visibly affected and was still useful for a coating composition.

EXAMPLE 5

Same as Example 2 with the substitution of potassium N-coco-beta-amino-butyrate. Comparable results were obtained.

EXAMPLE 6

Two hundred parts of a commercially available emulsion copolymer (Hycar 1561—B. F. Goodrich Chemical Company) containing 40% solids of which 40% by weight was acrylonitrile and 60% by weight was butadiene with an average particle size of .05 micron were subjected to one freeze thaw cycle as in Example 1. After the latex reached the thawing temperature it was found to be unsuited for coating purposes.

EXAMPLE 7

Two hundred parts of the same latex used in Example 6 were combined with 2.40 parts of potassium N-coco-beta-amino-butyrate. The sample was then subjected to five freeze thaw cycles as described in Example 2. The sample was not visibly affected and was used to deposit a clear coating on paper.

EXAMPLE 8

Two hundred grams of a commercially available copolymer (Hycar 1552—B. F. Goodrich Chemical Company) containing 52% solids of which 33% by weight was acrylonitrile and 67% by weight was butadiene, with an average particle size of .1800 micron, were frozen and thawed as described in Example 1. Upon thawing the viscosity had increased and the material coagulated to a point where it was no longer useful.

EXAMPLE 9

Two hundred parts of the emulsion copolymer used in Example 8 were blended with 0.26 part of potassium N-coco-beta-amino-butyrate. The sample was then subjected to five successive freeze-thaw cycles as described in Example 2. The viscosity was measured and found not to have changed appreciably, and the latex was capable of depositing a continuous film from the dispersed phase.

EXAMPLE 10

A commercial emulsion paint known to contain latex as the principal binder was purchased on the open market. The dry rubber hydrocarbon in percent was listed on the label. This was assumed to be the total rubber hydrocarbon present for the purpose of the experiment. The sample was divided into aliquot portions. To one aliquot portion 1.5% by weight of sodium N-coco-beta-aminobutyrate was added based on the dry rubber hydrocarbon of the aliquot sample. After one freeze thaw cycle as described in Example 1 the untreated aliquot sample was not capable of being applied as a paint as it was devoid of brushing qualities it originally had before freezing. The sample treated with the addition of sodium N-coco-beta-amino-butyrate was still capable of being applied as a paint.

EXAMPLE 11

The following example is a latex paint formulation which has been improved by the addition of sodium N-coco-beta-amino-butyrate. The latex paint is improved in its ability to withstand numerous consecutive freeze thaw cycles as illustrated by Table 1.

*Preparation of soya protein solution*

|  | Parts |
|---|---|
| Water | 744.0 |
| Dowcide "G" (sodium pentachlorophenate) | 16.0 |
| Sulfonated tallow | 30.0 |
| Soya protein (Drackett Protein 220) | 120.0 |
| Sodium hydroxide (10% sol.) | 78.0 |
| Boric acid (granular) | 12.0 |
| Total | 1000.0 |

Total solids 18.58%.

Agitate the water, add Dowcide "G," sulfonated tallow, and soya protein together, continue agitation and heat to 195° F. Hold temperature for 20 minutes, then add sodium hydroxide solution quickly. Maintain temperature at 195° F. for 30 minutes. Add boric acid slowly and hold 195° F. temperature for 15 minutes more. Replace water loss due to evaporation while heating.

*Oil modified base*

|  | Parts by weight |
|---|---|
| (1) Soya protein solution | 175.0 |
| (2) Distilled water | 188.0 |
| (3) Tetrasodium pyrophosphate | 2.0 |
| (4) Sodium salt of alkyl aryl sulfonate | 2.0 |
| (5) Lithopone | 100.0 |
| (6) Rutile, $TiO_2$ | 150.0 |
| (7) Mica talc | 40.0 |
| (8) Clay | 65.0 |
| (9) Lorite (75% $CaCO_3$—25% diatomaceous silica)[1] | 60.0 |
| (10) Bodied linseed oil | 45.0 |
| (11) Pine oil | 4.0 |
| (12) Lead napthenate, 25% | 1.0 |
| (13) Cobalt napthenate, 6% | 3.0 |
|  | 835.0 |

[1] National Lead Company.

Ingredients 1–9 were thoroughly mixed, ingredients 10–13 were added and the total base passed through a zone of high shear in an Eppenbach colloid mill.

To the above oil modified soya protein base, latex was added with mild agitation to give the following paint formulations:

Paint A—1255 parts base
423 parts of a commercial latex—48% solids[1]

1678 parts of latex paint

[1] Dow Chemical Company—512-K.

Two 450 gram samples of the above paint were placed in one-pint cans. One sample was used as a control and to the other sample 0.58 gram of sodium N-coco-beta-amino-butyrate was added with mild agitation. The viscosity was measured after each freeze thaw cycle with a Brookfield viscosimeter.

TABLE 1

| Paint A | Original Viscosity | Viscosity in Centipoise after— | | | |
|---|---|---|---|---|---|
|  |  | 1 Freeze | 2 Freeze | 3 Freeze | 4 Freeze |
| Paint A—no additive | 2,775 | 14,100 | 24,200 | Failed |  |
| Paint A+sodium N-coco-beta-amino-butyrate | 2,110 | 4,500 | 7,425 | 12,100 | 20,500 |

The paint control was considered to fail on the third freeze, when complete emulsion deterioration was indicated by the evidence of graining and coagulation of the latex portion of the paint. The paint containing sodium N-coco-beta-amino-butyrate was still capable of being applied as a paint.

EXAMPLE 12

*Oil free base*

The following oil-free soya protein base was prepared:

|  | Parts by weight |
|---|---|
| (1) Soya protein solution from Example 11 | 158.0 |
| (2) Distilled water | 162.0 |
| (3) Tetrasodium pyrophosphate | 2.0 |
| (4) Rutile, $TiO_2$ | 200.0 |
| (5) Lithopone | 100.0 |
| (6) Mica talc | 25.0 |
| (7) Clay | 75.0 |
| (8) Pine oil | 4.0 |

The above ingredients were mixed thoroughly and passed through a zone of high shear in an Eppenbach colloid mill.

A commercially available latex was added to the above base to give the following paint formulation:

Paint B—
726 parts base
396 parts commercial latex—48% solids[1]

1122 parts latex paint

[1] Dow Chemical Company—512-K.

Three samples of the above paint were placed in one-pint cans. One sample was used as a control, and 1.6% (of the dry rubber hydrocarbon) of sodium N-coco-beta-amino-butyrate was added with mild agitation to the second. The third sample of paint was blended with 1.3% (based on the dry rubber hydrocarbon) of the salt of N-coco-beta-amino-butyric acid and N-bis(2-hydroxyethyl) soya amine. The samples were then subjected to four freeze thaw cycles (−10 degrees below zero °F. to +70° F.), and the viscosities measured after each cycle. A Brookfield viscosimeter was used to measure the viscosities in centipoises.

| Paint A | 1 Freeze | 2 Freeze | 3 Freeze | 4 Freeze |
|---|---|---|---|---|
| Paint B—no additive | Failed |  |  |  |
| Paint B+sodium N-coco-beta-amino-butyrate | 700 | 620 | 650 | 620 |
| Paint B+Salt of N-coco-beta-amino-butyric acid and N-bis(2-hydroxyethyl) soya amine | 800 | 980 | 930 | 950 |

The above table shows the control paint to be completely coagulated and no longer capable of being applied as a paint, after the first freeze cycle. The paints containing the additives were still capable of being applied as paints after four freeze cycles.

The above examples are believed to amply illustrate the best mode of practicing our invention. It will be appreciated, however, that other modifications can be made without departing from the spirit and scope of our invention.

We claim:

1. A water-base emulsion type coating composition of improved freeze resistance containing a dispersed phase having present therein a polymeric latex wherein the polymer is selected from the group consisting of a styrene-butadiene copolymer and a butadiene-acrylonitrile copolymer, an aqueous phase, and at least about 0.10% by weight based on the latex solids of a compound having the formula RNHCH(CH$_3$)CH$_2$COOM wherein R is an aliphatic hydrocarbon radical having from 8 to 18 carbon atoms and M is an alkali metal selected from the group consisting of sodium and potassium.

2. A water-base emulsion type coating composition of improved freeze resistance containing a dispersed phase having present therein a polymeric latex wherein the polymer is selected from the group consisting of a styrene-butadiene copolymer and a butadiene-acrylonitrile copolymer, an aqueous phase, and at least about 0.10% by weight based on the latex solids of a compound having the formula RNHCH(CH$_3$)CH$_2$COONa or wherein R is an aliphatic hydrocarbon radical having from 8–18 carbon atoms.

3. A water-base emulsion type coating composition of improved freeze resistance containing a dispersed phase having present therein a polymeric latex wherein the polymer is selected from the group consisting of a styrene-butadiene copolymer and a butadiene-acrylonitrile copolymer, an aqueous phase, and at least about 0.10% by weight based on the latex solids of a compound having the formula RNHCH(CH$_3$)CH$_2$COOK, wherein R is an aliphatic hydrocarbon radical having from 8–18 carbon atoms.

4. A water-base emulsion-type coating composition of improved freeze resistance containing a dispersed phase having present therein a polymeric latex wherein the polymer is selected from the group consisting of a styrene-butadiene copolymer and a butadiene-acrylonitrile copolymer, an aqueous phase, and at least about 0.10% by weight based on the latex solids of sodium N-coco-beta-amino-butyrate.

5. A water-base emulsion-type coating composition of improved freeze resistance containing a dispersed phase having present therein a polymeric latex wherein the polymer is selected from the group consisting of a styrene-butadiene copolymer and a butadiene-acrylonitrile copolymer, an aqueous phase, and at least about 0.10% by weight based on the latex solids of potassium N-coco-beta-amino-butyrate.

6. A water-base emulsion-type coating composition of improved freeze resistance containing a dispersed phase having present therein a polymeric latex wherein the polymer is selected from the group consisting of a styrene-butadiene copolymer and a butadiene-acrylonitrile copolymer, an aqueous phase, and from about 0.10% to about 15% by weight based on the latex solids of a compound having the formula

RNHCH(CH$_3$)CH$_2$COOM wherein R is an aliphatic hydrocarbon radical having from 8 to 18 carbon atoms and M is an alkali metal selected from the group consisting of sodium and potassium.

7. A water-base emulsion-type coating composition of improved freeze resistance containing a dispersed phase having present therein a polymeric latex wherein the polymer is selected from the group consisting of a styrene-butadiene copolymer and a butadiene-acrylonitrile copolymer, an aqueous phase, and at least about 0.10% to about 15% by weight based on the latex solids of a compound having the formula RNHCH(CH$_3$)CH$_2$COONa wherein R is an aliphatic hydrocarbon radical having from 8 to 18 carbon atoms.

8. A water-base emulsion-type coating composition of improved freeze resistance containing a dispersed phase having present therein a polymeric latex wherein the polymer is selected from the group consisting of a styrene-butadiene copolymer and a butadiene-acrylonitrile copolymer, an aqueous phase, and at least about 0.10% to about 15% by weight based on the latex solids of a compound having the formula

RNHCH(CH$_3$)CH$_2$COOK wherein R is an aliphatic hydrocarbon radical having from 8 to 18 carbon atoms.

9. A water-base emulsion-type coating composition of improved freeze resistance containing a dispersed phase having present therein a polymeric latex wherein the polymer is selected from the group consisting of a styrene-butadiene copolymer and a butadiene-acrylonitrile copolymer, an aqueous phase, and at least about 0.10% to about 15% by weight based on the latex solids of sodium N-coco-beta-amino-butyrate.

10. A water-base emulsion-type coating composition of improved freeze resistance containing a dispersed phase having present therein a polymeric latex wherein the polymer is selected from the group consisting of a styrene-butadiene copolymer and a butadiene-acrylonitrile copolymer, an aqueous phase, and at least about 0.10% to about 15% by weight based on the latex solids of potassium N-coco-beta-amino-butyrate.

11. A process for improving the freeze-thaw stability of a water-base emulsion-type coating composition containing a polymeric latex wherein the polymer is selected from the group consisting of a styrene-butadiene copolymer and a butadiene-acrylonitrile copolymer and an aqueous phase which comprises incorporating in said composition at least about 0.10% by weight based upon the latex solids of a compound having the formula

RNHCH(CH$_3$)CH$_2$COOM wherein R is an aliphatic hydrocarbon radical having from 8 to 18 carbon atoms and M is an alkali metal selected from the group consisting of sodium and potassium.

12. A process for improving the freeze-thaw stability of a water-base emulsion-type coating composition containing a polymeric latex wherein the polymer is selected from the group consisting of a styrene-butadiene copolymer and a butadiene-acrylonitrile copolymer and an aqueous phase which comprises incorporating in said composition at least about 0.10% by weight based upon the latex solids of a compound having the formula RNHCH(CH$_3$)CH$_2$COONa wherein R is an aliphatic hydrocarbon radical having from 8 to 18 carbon atoms.

13. A process for improving the freeze-thaw stability of a water-base emulsion-type coating composition containing a polymeric latex wherein the polymer is selected from the group consisting of a styrene-butadiene copolymer and a butadiene-acrylonitrile copolymer and an aqueous phase which comprises incorporating in said composition at least about 0.10% by weight based upon the latex solids of a compound having the formula

RNHCH(CH$_3$)CH$_2$COOK wherein R is an aliphatic hydrocarbon radical having from 8 to 18 carbon atoms.

14. A process for improving the freeze-thaw stability of a water-base emulsion-type coating composition containing a dispersed phase having present therein a polymeric latex wherein the polymer is selected from the group consisting of a styrene-butadiene copolymer and a butadiene-acrylonitrile copolymer and an aqueous phase which comprises incorporating in said composition at least about 0.10% by weight based on the latex solids of sodium N-coco-beta-amino-butyrate.

15. A process for improving the freeze-thaw stability of a water-base emulsion-type coating composition containing a dispersed phase having present therein a polymeric latex wherein the polymer is selected from the group consisting of a styrene-butadiene copolymer and a butadiene-acrylonitrile copolymer and an aqueous phase which comprises incorporating in said composition at least about 0.10% by weight based on the latex solids of potassium N-coco-beta-amino-butyrate.

16. A process for the improvement of the freeze-thaw stability of a water-base emulsion-type coating composition containing a dispersed phase having present therein a polymeric latex wherein the polymer is selected from the group consisting of a styrene-butadiene copolymer and a butadiene-acrylonitrile copolymer and an aqueous phase which comprises incorporating in said coating composition between about 0.10% and 15% by weight based on the latex solids of a compound having the formula $RNHCH(CH_3)CH_2COOM$ where R is an aliphatic hydrocarbon radical having from 8 to 18 carbon atoms and M is an alkali metal selected from the group consisting of sodium and potassium.

17. A process for improving the freeze-thaw stability of a water-base emulsion-type coating composition containing a polymeric latex wherein the polymer is selected from the group consisting of a styrene-butadiene copolymer and a butadiene-acrylonitrile copolymer and an aqueous phase which comprises the steps of incorporating in said composition at least about 0.10% to about 15% by weight based upon the latex solids of a compound having the formula $RNHCH(CH_3)CH_2COONa$ wherein R is an aliphatic hydrocarbon radical having from 8 to 18 carbon atoms.

18. A process for improving the freeze-thaw stability of a water-base emulsion-type coating composition containing a polymeric latex wherein the polymer is selected from the group consisting of a styrene-butadiene copolymer and a butadiene-acrylonitrile copolymer and an aqueous phase, comprising incorporating in said composition at least about 0.10% to about 15% by weight based upon the latex solids of a compound having the formula $RNHCH(CH_3)CH_2COOK$ wherein R is an aliphatic hydrocarbon radical having from 8 to 18 carbon atoms.

19. A process for improving the freeze-thaw stability of a water-base emulsion-type coating composition containing a dispersed phase having present therein a polymeric latex wherein the polymer is selected from the group consisting of a styrene-butadiene copolymer and a butadiene-acrylonitrile copolymer and an aqueous phase which comprises incorporating in said composition at least about 0.10% to about 15% by weight based on the latex solids of sodium, N-coco-beta-amino-butyrate.

20. A process for improving the freeze-thaw stability of a water-base emulsion-type coating composition containing a dispersed phase having present therein a polymeric latex wherein the polymer is selected from the group consisting of a styrene-butadiene copolymer and a butadiene-acrylonitrile copolymer and an aqueous phase which comprises incorporating in said composition at least about 0.10% to about 15% by weight based on the latex solids of potassium N-coco-beta-amino-butyrate.

No references cited.